(12) United States Patent
Grimanis et al.

(10) Patent No.: US 9,366,340 B2
(45) Date of Patent: Jun. 14, 2016

(54) NON-CONTACTING LABYRINTH SEAL ASSEMBLY (71) Applicant: A.W. CHESTERTON COMPANY, Woburn, MA (US)

(72) Inventors: Michael P. Grimanis, Wayland, MA (US); Thomas Richard, Peabody, MA (US)

(73) Assignee: A.W. CHESTERTON COMPANY, Woburn, MA (US)

( * ) Notice: Subject to any disclaimer, the term of this patent is extended or adjusted under 35 U.S.C. 154(b) by 13 days.

(21) Appl. No.: 14/167,244

(22) Filed: Jan. 29, 2014

(65) Prior Publication Data

US 2015/0211639 A1    Jul. 30, 2015

(51) Int. Cl.
| | |
|---|---|
| *F16J 15/16* | (2006.01) |
| *F16J 15/447* | (2006.01) |
| *F16J 15/00* | (2006.01) |

(52) U.S. Cl.
CPC .............. *F16J 15/447* (2013.01); *F16J 15/008* (2013.01); *F16J 15/164* (2013.01); *F16J 15/4474* (2013.01)

(58) Field of Classification Search
CPC ......... F16J 15/44; F16J 15/441; F16J 15/443; F16J 15/447; F16J 15/4472; F16J 15/4474; F16J 15/4476; F16J 15/4478
See application file for complete search history.

(56) References Cited

U.S. PATENT DOCUMENTS

| | | | | |
|---|---|---|---|---|
| 2,352,336 | A | * | 6/1944 | Martin et al. ................. 277/433 |
| 2,478,649 | A | | 8/1949 | Wightman |
| 2,637,574 | A | | 5/1953 | Diehl |
| 2,894,769 | A | * | 7/1959 | Richmond et al. ............ 277/362 |
| 3,038,733 | A | | 6/1962 | Hudson |
| 3,266,811 | A | | 8/1966 | Knauth |
| 4,114,902 | A | | 9/1978 | Orlowski |
| 5,078,410 | A | * | 1/1992 | Warman et al. ............... 277/433 |
| 5,290,047 | A | | 3/1994 | Duffee et al. |
| 6,367,807 | B1 | | 4/2002 | Rockwood |
| 2004/0070150 | A1 | * | 4/2004 | Chitren et al. ................ 277/358 |
| 2009/0127795 | A1 | | 5/2009 | Lattime et al. |

OTHER PUBLICATIONS

International Search Report and Written Opinion, PCT/US2015/013438, dated May 6, 2015, pp. 1-13.

* cited by examiner

*Primary Examiner* — Gilbert Lee
(74) *Attorney, Agent, or Firm* — Nelson Mullins Riley & Scarborough LLP; Anthony A. Laurentano (57) ABSTRACT

A labyrinth seal assembly is provided for forming a seal between a shaft and housing. The seal assembly includes a stationary element configured to be coupled to the housing and having an annular shape defining a space through which the shaft extends; a rotary element disposed within the space and coupled to the shaft so as to rotate therewith, the rotary element having an outer surface that extends in an axial direction and having a groove formed therein, the rotary element being disposed between the stationary element and the shaft; and a valve element mounted within the groove and disposed between the stationary element and the rotary element when assembled to form the seal. The valve element is formed from an elastomeric material.

19 Claims, 6 Drawing Sheets

NON-CONTACTING LABYRINTH SEAL ASSEMBLY

FIELD OF THE INVENTION

The present invention relates to a seal assembly for sealing a shaft or a rod relative to a stationary housing component. This invention relates generally to rotary shaft seals. More particularly, the present invention relates to a labyrinth seal for sealing a fluid within the housing and for helping prevent contaminates from entering the same.

BACKGROUND OF THE INVENTION

Conventional mechanical seal assemblies are employed in a wide variety of environments and settings, such as for example in mechanical apparatuses, to provide a fluid-tight seal. The sealing assemblies are usually positioned about a rotating shaft or rod that is mounted in and protrudes from a stationary mechanical housing. The rotary seal is generally constructed and designed so as to try to prevent unwanted particles from entering the machine housing and contaminating a fluid contained therein, but the seal must also retain fluid, such as oil, process fluid or a barrier fluid, typically located in a fluid reservoir inside the housing. Hence, the need for minimizing leakage while prolonging the machine's operating life is important, as the demands for reliability and the penalties for failure continue to rise.

Those of ordinary skill in the art will readily recognize that it is typically difficult to maintain rotating equipment because of extreme equipment duty cycles, the lessening of service factors, the particular seal design, and the lack of spare rotating equipment in many processing plants. Various forms of conventional shaft sealing devices have been utilized in the art to try to protect the integrity of the seal environment, including lip seals, labyrinth seals, magnetic seals, and the like.

Conventional lip seals include a sealing element with a lip that helps prevent leakage of fluid from the housing by contacting the rotating shaft. A drawback of conventional lip seals is that they can quickly wear out and fail over time, and are also known to permit excessive amounts of moisture and other contaminants to migrate into the fluid reservoir of the housing.

A labyrinth seal is typically a non-contacting frictionless seal that includes no friction, given that there is no sealing contact between the stationary component and the revolving component during use. The labyrinth seal is capable of creating a seal and preventing contaminants from reaching the fluid within the housing by creating a complicated path (i.e., a labyrinth) for liquids to pass through, thus making it challenging for liquids to cross the barrier created by the seal because they have difficulty making their way through the labyrinth. These types of seals are used in a variety of settings, and can be used on objects which rotate and otherwise move. Indeed, movement such as shaft rotation can often make the labyrinth seal even more effective, depending on the design, by creating a centrifugal force that further serves to trap contaminants and fluids within the seal. While a labyrinth seal is typically not designed to handle pressure differentials, it can be used in many other types of important environments.

A drawback of conventional labyrinth seals is that that they are expensive and typically have complex designs that require tight tolerances. Any movement of the parts of the seal from their default positions during operation results in increased fluid leakage and a reduction in the ability of the seal to prevent contaminants from entering the mechanical housing.

SUMMARY OF THE INVENTION

It is therefore an object of the present invention to provide a labyrinth type seal that employs rotary and stationary seal ring components that can be easily positioned relative to each other for enhanced fluid sealing and debris containment.

It is also an object of the present invention to provide a labyrinth type seal that employs a valve element as part of the seal assembly that is selectively movable between non-contacting and contacting seal positions.

According to one embodiment of the present invention, a labyrinth seal assembly is provided that forms a seal between a shaft and housing. The labyrinth seal assembly includes a stationary element, a rotary element, and a valve element. The stationary element has an annular shape and is configured to couple to the housing so as to define a space through which the shaft extends. The rotary element is disposed within the space and is coupled to the shaft so as to rotate therewith. The rotary element has an outer surface that extends in an axial direction and has a groove formed therein. When assembled, the rotary element is disposed between the stationary element and the shaft. The valve element is mounted within the groove and is disposed between the stationary element and the rotary element when assembled. The valve element is sized and dimensioned such that a portion of the valve element extends radially outwardly from the groove when mounted therein.

The stationary element has an outer surface and an inner surface having a first radially innermost axially extending inner surface and a first stepped radially extending surface coupled thereto. The valve element is movable between a contacting position and a non-contacting position in response to rotation of the shaft. Specifically, the valve element is adapted to contact the first stepped axially extending surface when disposed in the contacting position to form the seal.

According to one practice, the valve element is disposed in the non-contacting position when the shaft rotates and is disposed in the contacting position when the shaft ceases rotation. Preferably, the valve element is formed from an elastomeric material. More specifically, the valve element is formed from a polyurethane material, a rubber material, a silicon based material, or a fluorocarbon based material.

In the labyrinth seal assembly of the present invention, either or both of the stationary element and the rotary element can be formed from metal or a plastic material, such as polyurethane, nylon, PTFE, acetal, or any other suitable type of engineered plastic.

With regard to the construction and design of the stationary element and the rotary element, the first radially innermost, axially extending inner surface of the stationary element has one or more grooves formed thereon and one or more ribs formed thereon. According to one embodiment, the inner surface of the stationary element includes a second intermediate axially extending inner surface spaced radially outwardly from the first radially innermost axially extending inner surface, and a third radially outermost axially extending inner surface disposed radially outwardly from the second intermediate axially extending inner surface, wherein the second and third axially extending inner surfaces are connected by a second stepped radially extending surface.

The rotary element includes an inner surface that extends in an axially direction, where the inner surface has a plurality of ribs formed thereon. The outer surface of the rotary element comprises a first axially extending outer surface, a second axially extending outer surface spaced radially inwardly of the first axially extending outer surface, and a stepped radially extending surface disposed between the first and second outer surfaces, where the groove is formed on the second axially extending outer surface. The valve element comprises a main body having an intermediate portion, a first flange disposed along an inner circumferential portion of the valve element, and a second flange disposes along an outer circumferential portion of the valve element. The first flange has a shape that is different than a shape of the second flange.

Further, the inner surface of the stationary element further comprises a second intermediate axially extending inner surface spaced radially outwardly from the first radially innermost axially extending inner surface, and a third radially outermost axially extending inner surface disposed radially outwardly from the second intermediate axially extending inner surface, wherein the second and third axially extending inner surfaces are connected by a second stepped radially extending surface. The outer surface of the rotary element comprises a first axially extending outer surface, a second axially extending outer surface spaced radially inwardly of the first axially extending outer surface, and a stepped radially extending surface disposed between the first and second outer surfaces, where the groove is formed on the second axially extending outer surface. The second intermediate axially extending inner surface and the second stepped radially extending surface of the stationary element, and the second axially extending outer surface and the stepped radially extending surface of the rotary element define a space where the valve element is disposed when mounted within the groove.

According to another feature of the present invention, a method of forming a seal between a shaft and housing is provided. A labyrinth seal assembly is provided having a stationary element, a rotary element and a valve element, where the valve element is disposed in a groove formed in the rotary element and is positioned when assembled between the stationary element and the rotary element. The valve element is moved between a contacting position and a non-contacting position based on rotation of the shaft, and the valve element is sized and dimensioned such that a portion of the valve element extends radially outwardly from the groove when mounted therein. The valve element is adapted to contact the stationary element when disposed in the contacting position to form the seal.

The stationary element has an outer surface and an inner surface, where the inner surface includes a first radially innermost axially extending inner surface and a first stepped radially extending surface coupled thereto, and the valve element is adapted to contact the first stepped axially extending surface when disposed in the contacting position.

According to another feature of the present invention, a labyrinth seal assembly is provided for forming a seal between a shaft and housing. The seal assembly includes a stationary element configured to be coupled to the housing and having an annular shape defining a space through which the shaft extends; a rotary element disposed within the space and coupled to the shaft so as to rotate therewith, the rotary element having an outer surface that extends in an axial direction and having a groove formed therein, the rotary element being disposed between the stationary element and the shaft; and a valve element mounted within the groove and disposed between the stationary element and the rotary element when assembled to form the seal. The valve element is formed from an elastomeric material.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

The present invention provides a labyrinth type seal assembly for providing sealing on a rotating shaft or other suitable device. The seal assembly also helps reduce the amount of particulates that enters the mechanical housing. The present invention will be described below relative to the illustrated embodiment(s). Those skilled in the art will readily appreciate that the present invention may be implemented in a number of different applications and embodiments and is not specifically limited in its application to the particular embodiment depicted herein.

The terms "seal assembly" and "sealing assembly" as used herein are intended to include various types of mechanical type sealing assemblies, including labyrinth seals, single seals, split seals, concentric seals, and other known seal and sealing assembly types and configurations. The terms "labyrinth type seal assembly," "labyrinth seal assembly" and "labyrinth seal" are used interchangeably to refer to the labyrinth seal illustrated in the accompanying Figures.

The term "shaft" is intended to refer to any suitable rotatable device in a mechanical system to which a seal can be mounted and includes shafts, rods and other known devices.

The terms "axial" and "axially" as used herein refer to a direction generally parallel to the axis of a shaft. The terms "radial" and "radially" as used herein refer to a direction generally perpendicular to the axis of a shaft. The terms "fluid" and "fluids" refer to liquids, gases, and combinations thereof.

The term "axially inner" as used herein refers to that portion of the stationary equipment and a seal assembly disposed proximate the mechanical system employing the seal assembly. Conversely, the term "axially outer" as used herein refers to the portion of stationary equipment and a seal assembly distal from the mechanical system.

The term "radially inner" as used herein refers to the portion of the seal assembly proximate a shaft. Conversely, the term "radially outer" as used herein refers to the portion of the seal assembly distal from the shaft.

The terms "mechanical housing," "stationary equipment" and/or "static surface" as used herein are intended to include any suitable stationary mechanical structure housing a shaft or rod to which a seal assembly is secured or coupled thereto.

The labyrinth type seal assembly of an illustrative embodiment of the present invention may employ a stationary element, a rotary element, and a valve element that is coupled to the stationary element.

Labyrinth seals are typically constructed in multiple pieces. One piece, known as the stator or stationary element, is affixed to the machine housing and remains stationary. The other piece, called the rotor or rotary element, is attached to the shaft and rotates therewith. The two pieces typically interlock in a frictionless, non-contacting manner to effectively seal out the majority of contaminants while holding in the lubricant or process fluid. Labyrinth seals are non-contacting, which means that the two opposing axial and radial faces do not touch each other during use. They are also considered frictionless, as the rotary element and the stationary element are separated by a small gap. All contaminants trying to enter the bearing housing typically must traverse the labyrinth or maze of turns and angles formed by the stationary element and the rotary element when assembled in order to reach the axial inner regions of the seal assembly and mechanical housing. On the path through all of these turns, particles are constantly subjected to centrifugal forces due to the rotational motion of the shaft, and only a very small number of contaminates make it through the entire length of the seal. This is the primary sealing function of a labyrinth seal assembly.

The labyrinth seal assembly 10 of the present invention is illustrated in FIGS. 1-8B. With reference to FIGS. 1, 3A, 3B, and 7, the labyrinth seal assembly 10 includes a rotary element 20 that is coupled to a rotary shaft 12 via any suitable connection mechanism. The labyrinth seal assembly 10 also includes a stationary element 30 that is coupled to a mechanical housing 14, and a valve element 40 that is coupled to the rotary element 20 and positioned when assembled between the rotary element 20 and the stationary element 30.

The rotary element 20 has a main body that has an inner generally axially extending surface 22 that includes a plurality of ribs 62 that are sized and dimensioned for seating within corresponding annular notches or grooves 72 formed in the shaft 12. The mating engaging relationship between the ribs and the grooves helps rotationally couple the rotary element 20 to the shaft. The stationary element 30 also includes a top surface 24 and an axially extending outer surface 26. The outer surface 26 includes a radially outermost axially extending first outer surface 82 and a substantially parallel radially innermost axially extending second surface 86. The outer surfaces 82, 86 are coupled together by a radially extending stepped surface 84. The second outer surface 86 includes a groove 28 formed therein, and a plurality of ribs 88 (surface features) protrude outwardly from the second surface 86. Those of ordinary skill in the art will readily recognize that the second outer surface 86 can include any selected number of ribs or surface features, and the ribs or surface features can have any selected shape or size. Moreover, the outer surface 26 can have any suitable shape or design, and can include for example multiple stepped surfaces.

The stationary element 30 also has a main body that has an inner generally axially extending surface 32 and an opposed outer generally axially extending surface 34. The outer surface 34 includes a radially outermost axially extending first outer surface 92 and a substantially parallel radially innermost axially extending second surface 96. The outer surfaces 92, 96 are coupled together by a radially extending stepped surface 94. The second outer surface 96 has a plurality of ribs 98 formed thereon for coupling the stationary element to the housing 14. Specifically, the ribs are sized and dimensioned to seat within corresponding grooves formed within an inner wall of the housing. Those of ordinary skill in the art will readily recognize that the second outer surface 96 can include any selected number of ribs or surface features, and the ribs or surface features can have any selected shape or size. Moreover, the outer surface 34 can have any suitable shape or design, and can include for example multiple stepped surfaces.

The inner surface 32 of the stationary element 30 can include for example multiple stepped surfaces. Specifically, according to one embodiment, the inner surface includes a first radially outermost and axially extending inner surface 102 and a second axially extending surface 106 that is positioned radially inwardly from the first axially extending inner surface 102. The surfaces 102 and 106 are coupled together by a first stepped surface 104 that radially extends between the first and second inner surfaces. The inner surface 32 also includes a third radially innermost axially extending surface 110 that is coupled to the second inner surface 106 by a second radially extending stepped surface 108. The stepped surface 108 also functions in some respects as a valve seat for the valve element 40 (i.e., shut-off valve or element). The third inner surface 110 can include any selected number or type of surface features, including for example a plurality of ribs 114 that extend radially inwardly toward the shaft 12. The third inner surface 110 can also include one or more grooves 118 formed therein for accommodating the ribs 88 that are formed on the second outer surface 86 of the rotary element 20. One of ordinary skill in the art will readily recognize that the inner surface 32 of the stationary element 30 can have any suitable shape and design, and can any selected number and type of surface features. Moreover, the illustrated shape and design of the ribs 88, 98 serves to concentrate a localized sealing force against the equipment surfaces to produce a static seal. In addition, the ribs help secure the stator and rotor components in place relative to the equipment bore and shaft, respectively.

Those of ordinary skill in the art will readily recognize that the stationary element 30 and the rotary element 20 can be formed from the same material or from different materials. Examples of the type of material that the stationary element 30 and the rotary element 20 can be formed from include metal and plastics, examples of which include polyurethane, nylon, polytetrafluoroethylene (PTFE), acetal and the like. One of ordinary skill in the art will readily be able to determine the proper material to be used based on the seal size, the seal environment, and other known factors.

The labyrinth type mechanical seal assembly 10 of the present invention also includes a valve element 30 that, when assembled, seats within the groove 28. The valve element 30, as shown for example in FIGS. 2A through 5, has an annular shape and has a main body 42 that has an intermediate or central portion 48 and a pair of flanges that extend therefrom. Specifically, the valve element has a first flange 44 that is formed along an inner circumferential portion of the main body and which extends axially away from the intermediate portion 48. The valve element also has a second flange 46 that is formed along an outer circumferential portion of the main body and which extends axially away from the intermediate portion. The first and second flanges can have any suitable shape and design. As shown, the first flange has a generally rectangular or square shape (e.g., a box type shape) and the second outer flange 46 is tapered at the outermost regions, as shown. The valve element during use functions as a secondary or supplemental sealing mechanism that further helps prevent contaminates from entering the housing.

The valve element can be formed from any suitable material and is preferably formed from an elastomeric material, such as rubber, polyurethane, fluorocarbon and the like.

Figure 1:
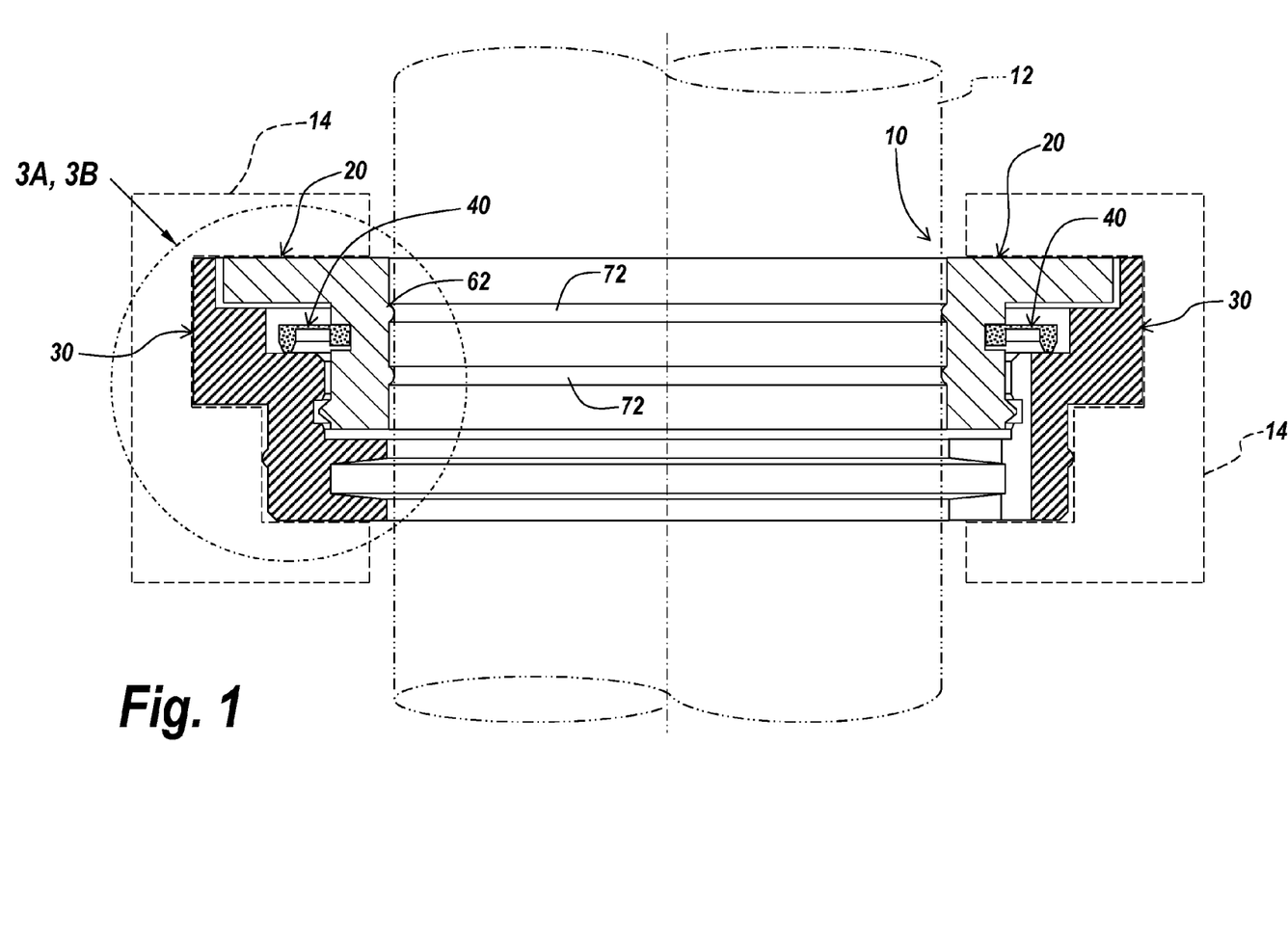
FIG. 1 is a cross-sectional perspective view of a labyrinth seal assembly mounted about a shaft and disposed in a housing according to the teachings of the present invention.
Figure 2A:
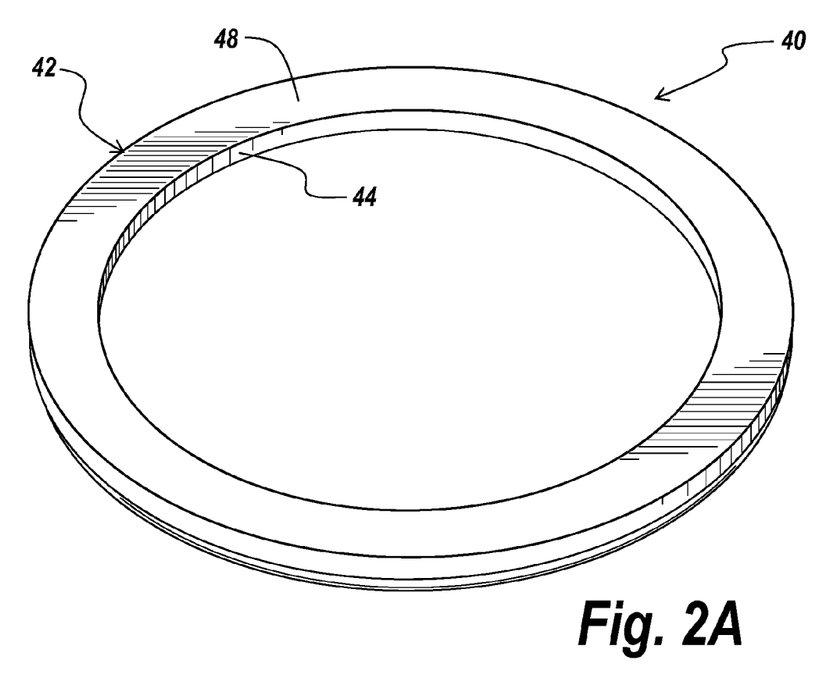
FIG. 2A is a top pictorial view of the valve element of FIG. 1 according to the teachings of the present invention.
Figure 2B:
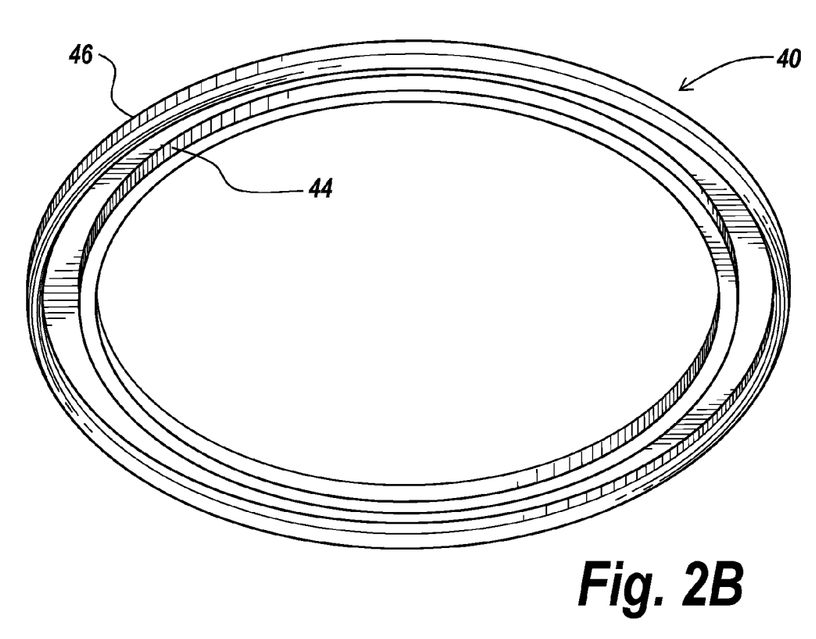
FIG. 2B is a bottom pictorial view of the valve element of FIG. 1 according to the teachings of the present invention.

In operation, the labyrinth seal assembly 10 is mounted within the mechanical housing. To that end, the stationary element 30 is mounted within the housing 14. The valve element 14 is mounted and positioned within the groove 28 that is formed in the rotary element 20. The rotary element is then mounted over the shaft 12 and positioned relative to the stationary element 30 so as to form a selected gap between the stationary and rotary elements. When positioned as such, the elements form a non-contacting and hence frictionless sealing arrangement. The stationary and rotary elements operate as a primary sealing mechanism and create when assembled together a winding pathway (i.e., a labyrinth) that extends between the ambient environment and the internal spaces of the mechanical housing (such as one or more fluid reservoirs). The winding pathway helps trap particulates therein so as to minimize the number that reaches the internal spaces. Additionally, the labyrinth seal assembly 10 helps retain fluid, such as a process fluid, within the housing 14.

The valve element 40 is mounted and positioned within the groove 28 such that a portion of the valve element extends radially outwardly from the groove. Specifically, the groove is sized and dimensioned to seat only the inner or first flange 44 of the valve element, although additional portions of the valve element can also be retained therein. The valve element when mounted as such is positioned in a space 52 formed by the second inner surface 106 and the second stepped surface of the stationary element 30 and the stepped surface 84 and the second outer surface 86 of the rotary element. The valve element 40 is movable between a contacting position where the second flange portion 46 of the valve element contacts the stationary element (surface 108), FIG. 3A, and a non-contacting position where the valve element 40 does not contact (is positioned away from) the stationary element, FIG. 3B. The valve element is movable between these two positions by the rotation of the shaft 12.

Figure 3A:
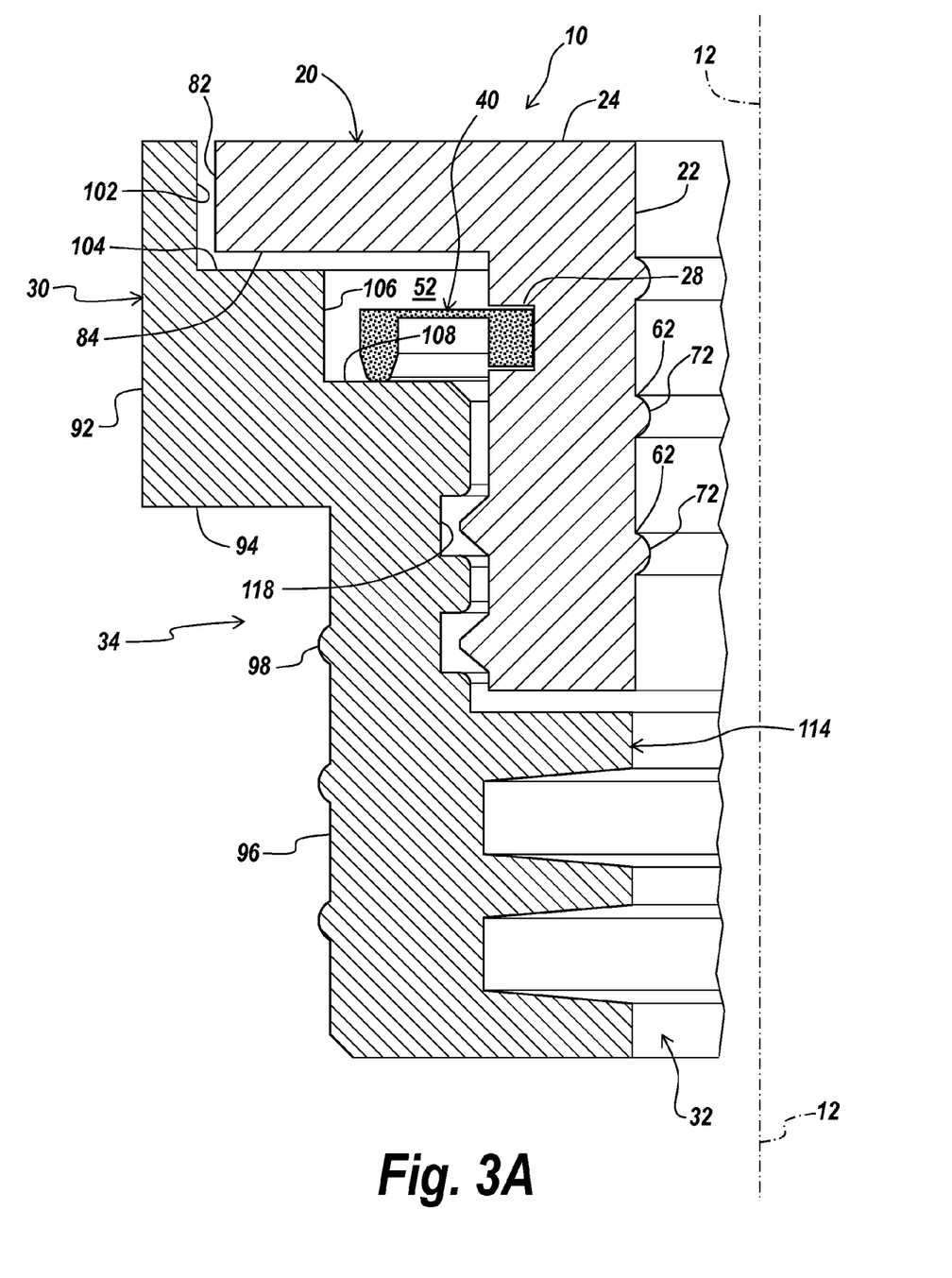
FIG. 3A is a partial fragmentary cross-sectional view of the left side of the labyrinth seal assembly of FIG. 1 showing the valve element disposed in a contacting position according to the teachings of the present invention.
Figure 3B:
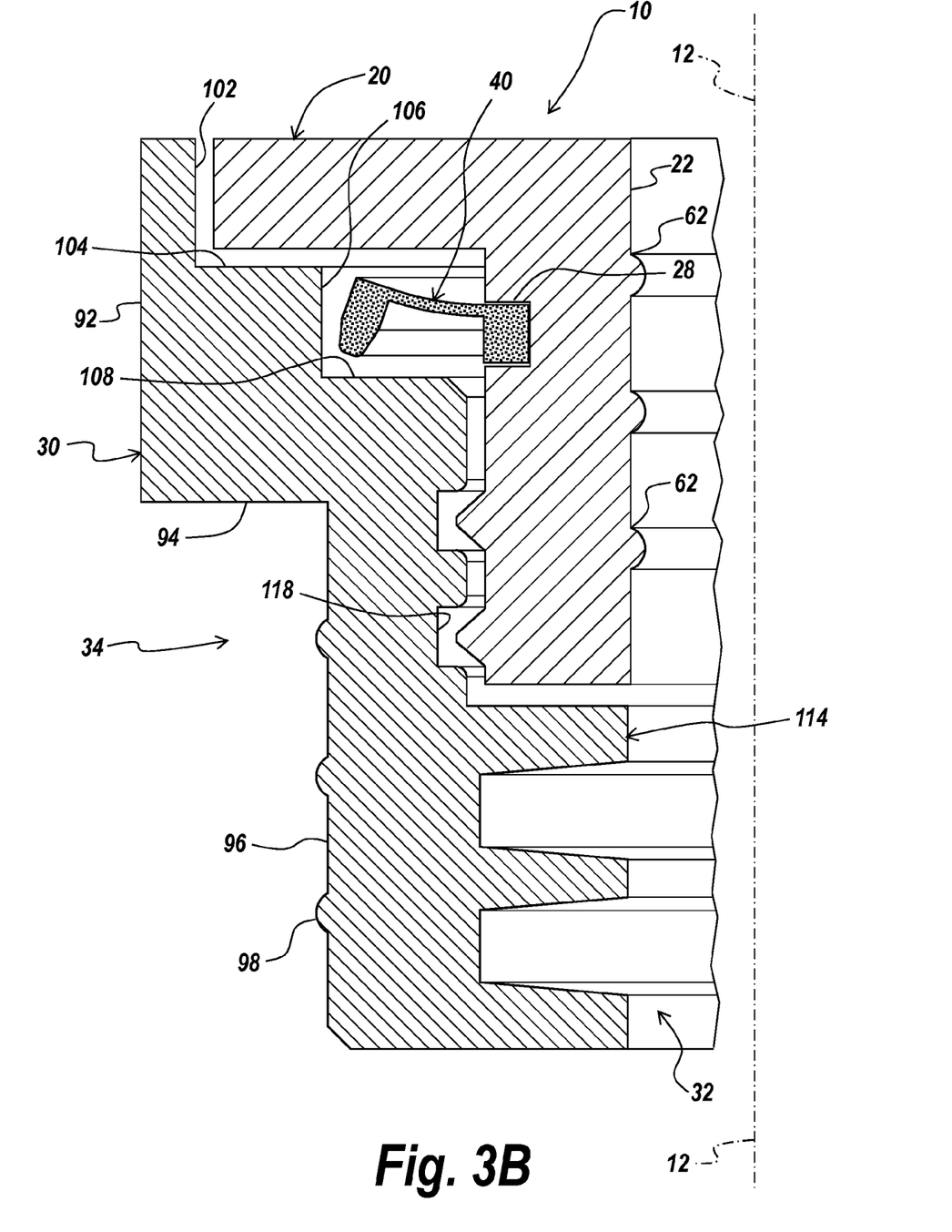
FIG. 3B is a partial fragmentary cross-sectional view of the left side of the labyrinth seal assembly of FIG. 1 showing the valve element disposed in a non-contacting position according to the teachings of the present invention.
Figure 4A:
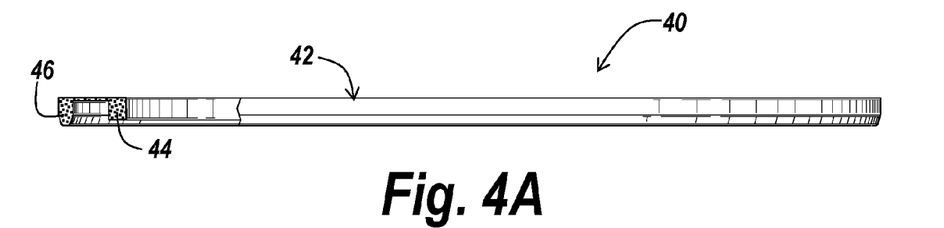
FIG. 4A is a side elevational view of the valve element of FIG. 1 showing the valve element disposed in a contacting position according to the teachings of the present invention.
Figure 4B:
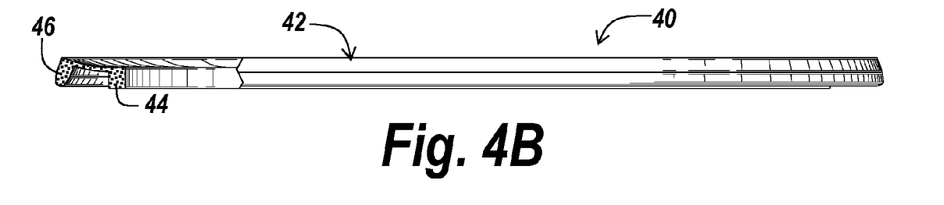
FIG. 4B is a side elevational view of the valve element of FIG. 1 showing the valve element disposed in a non-contacting position according to the teachings of the present invention.
Figure 5:
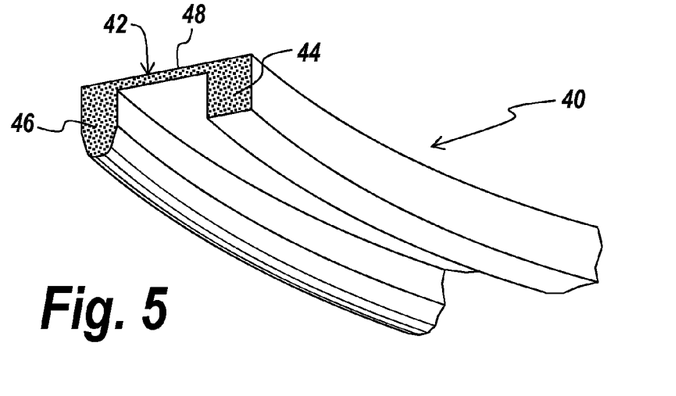
FIG. 5 is a pictorial cross-sectional view of the valve element of FIG. 1 according to the teachings of the present invention.

Prior to start up operation of the mechanical device and hence prior to rotation of the shaft, the valve element 20 is disposed in the contacting position (i.e., shut-off position) where the valve element contacts the stationary element 30. Specifically, the valve element is disposed within the space 52 and the outer tapered second flange 46 sealingly contacts the second stepped surface 108 of the inner surface 32 of the stationary element 30. The second stepped surface thus functions in essence as a valve seat or sealing surface. The valve element thus helps form a secondary seal between the stationary element and the rotary element and helps prevent contaminants from entering into the machine housing (such as into any oil/lubricant reservoir contained therein) from the ambient environment while concomitantly helping retain fluids therein. The stationary element and the rotary element of the labyrinth seal assembly form a primary sealing mechanism that helps prevent contaminants from entering the housing and fluid from escaping by the labyrinth (i.e., maze) that is formed by the seal elements. The valve element when employed as described above performs much like a secondary or supplemental sealing mechanism by further preventing fluid leakage and contaminants from entering the housing when the shaft is stationary based on the sealing engagement between the valve element and the stationary element.

Figure 6:
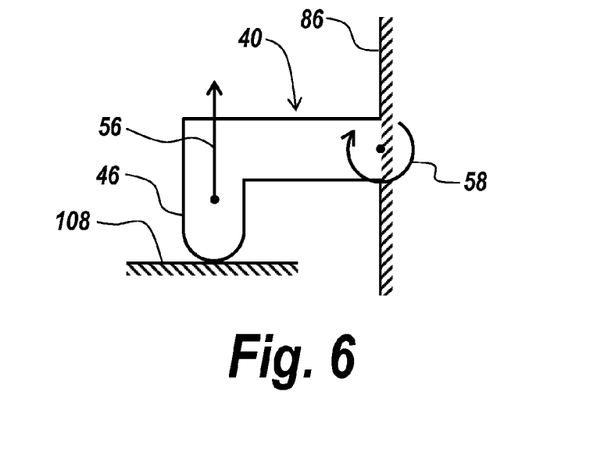
FIG. 6 is a representational schematic view of the valve element of FIG. 1 showing the force vectors acting thereupon during rotation of the shaft.
Figure 7:
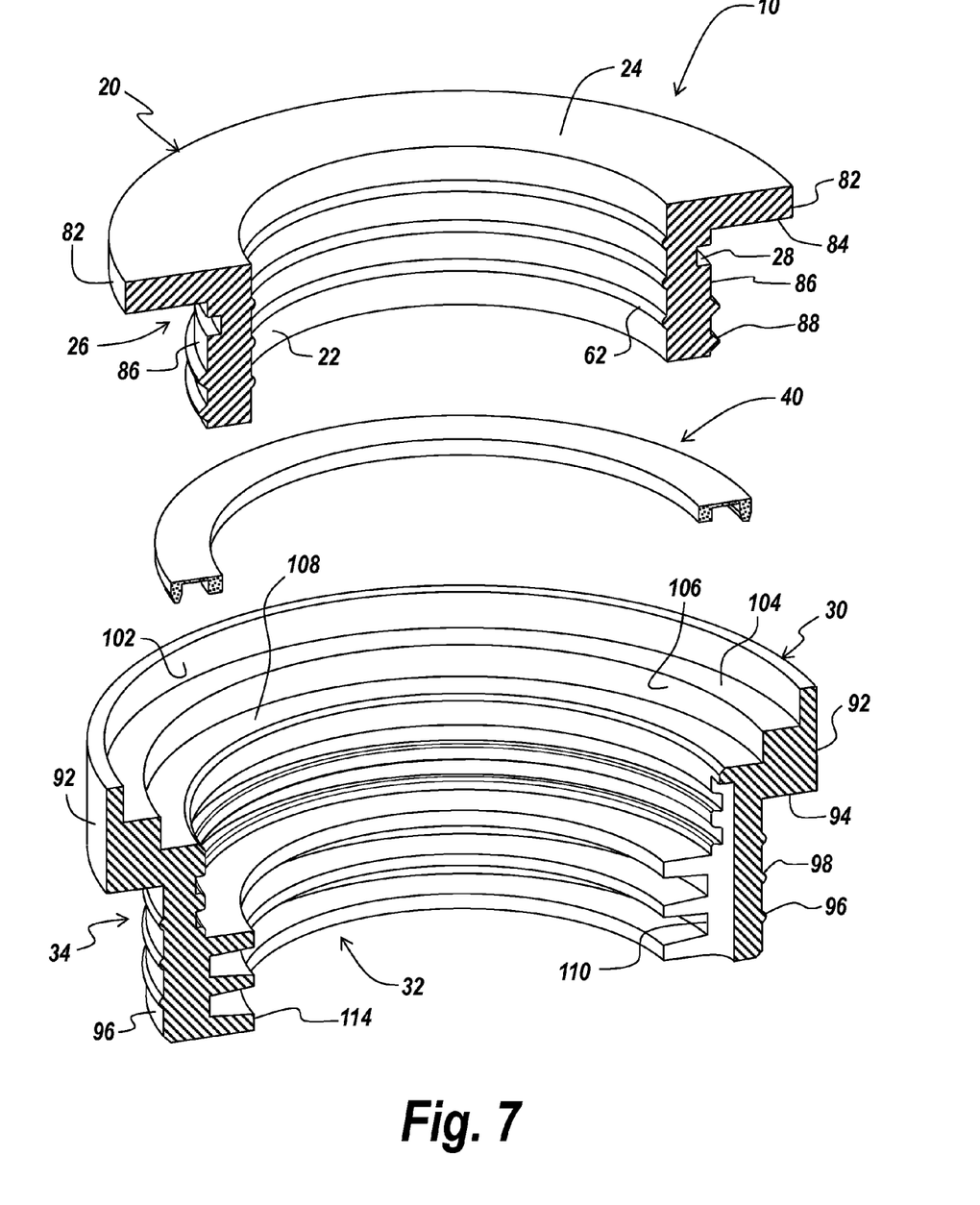
FIG. 7 is an exploded cross-sectional view of the labyrinth seal assembly according to the teachings of the present invention.

When the shaft starts to rotate, the valve element transitions from the contacting position to the non-contacting position, and hence moves away from the mating/sealing surface in order to reduce drag and to prevent unwanted heat generation. As described above, the valve element 30 has an asymmetric design wherein the first or inner flange 44 has a shape and configuration that is different than the shape of the outer or second flange 46. According to a preferred embodiment, the second flange 46 has a tapered shape that is different than the box-type shape of the first flange 44. When the shaft is rotating, the centrifugal force generated by the shaft applies a moment force on the center of gravity of the valve, such that the second flange 46 is lifted from the second stepped surface 108 of the stationary element. The principles of this force are generally illustrated in FIG. 6, where the labyrinth seal assembly 10 elements are generalized for purposes of simplicity and clarity. The moment force vector 56 which is a component of the centrifugal force represents the moment force that the flange 46 is subjected to during rotation of the shaft. This force 46 serves to lift the flange from the sealing/mating surface 108. The rotational force that the valve element is subjected to is represented by rotational force vector 58. When the valve element 40 is disposed in the non-contacting position, the labyrinth seal assembly 10 still prevents contaminants from entering the housing because of the maze or labyrinth of passages that are formed between the seal components. Moreover, the rotational action of the shaft further serves to trap contaminants to help retain fluid within the housing because centrifugal forces are imparted to the fluid coming in contact with the rotary element 20. The fluid is then thrown radially outward toward the channels (pathways) formed in the stationary element 30. During operation of the device, the fluid in general drains downwardly toward the bottom and then eventually drains back into the housing.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

We claim:

1. A labyrinth seal assembly for forming a seal between a shaft and a housing, comprising
    a stationary element configured to be coupled to the housing and having an annular shape defining a space through which the shaft extends,
    a rotary element disposed within the space and coupled to the shaft so as to rotate therewith, the rotary element having an outer surface that extends in an axial direction and having a groove formed therein, the rotary element being disposed between the stationary element and the shaft, and
    a valve element mounted within the groove and disposed between the stationary element and the rotary element when assembled, wherein the valve element is sized and dimensioned such that a portion of the valve element extends radially outwardly from the groove when mounted therein, wherein the stationary element has an outer surface and an inner surface, wherein the inner surface includes a first radially innermost axially extending inner surface and a first stepped radially extending surface coupled thereto, and wherein the valve element is movable between a contacting position and a non-contacting position in response to rotation of the shaft, and wherein the valve element is adapted to contact the first stepped axially extending surface when disposed in the contacting position to form the seal.

2. The labyrinth seal of claim 1, wherein the valve element is disposed in the non-contacting position when the shaft rotates.

3. The labyrinth seal of claim 2, wherein the valve element is disposed in the contacting position when the shaft ceases rotation.

4. The labyrinth seal of claim 1, wherein the valve element is formed from an elastomeric material.

5. The labyrinth seal of claim 4, wherein the elastomeric material includes a polyurethane material, a rubber material, a silicon based material, or a fluorocarbon based material.

6. The labyrinth seal of claim 1, wherein one of the stationary element and the rotary element are formed from metal.

7. The labyrinth seal of claim 1, wherein one of the stationary element and the rotary element are formed from a plastic material.

8. The labyrinth seal of claim 7, wherein the plastic material comprises polyurethane, nylon, PTFE, or acetal.

9. The labyrinth seal of claim 1, wherein the first radially innermost axially extending inner surface of the stationary element has one or more grooves formed thereon and one or more ribs formed thereon, wherein the grooves and the ribs are axially spaced from each other.

10. The labyrinth seal of claim 1, wherein the inner surface of the stationary element further comprises a second intermediate axially extending inner surface spaced radially outwardly from the first radially innermost axially extending inner surface, and a third radially outermost axially extending inner surface disposed radially outwardly from the second intermediate axially extending inner surface, wherein the second and third axially extending inner surfaces are connected by a second stepped radially extending surface.

11. The labyrinth seal of claim 1, wherein the rotary element further comprises an inner surface that extends in an axially direction, wherein the inner surface has a plurality of ribs formed thereon.

12. The labyrinth seal of claim 11, wherein the outer surface of the rotary element comprises
a first axially extending outer surface,
a second axially extending outer surface spaced radially inwardly of the first axially extending outer surface, and
a stepped radially extending surface disposed between the first and second outer surfaces,
wherein the groove is formed on the second axially extending outer surface.

13. The labyrinth seal of claim 1, wherein the valve element comprises a main body having an intermediate portion, a first flange disposed along an inner circumferential portion of the valve element, and a second flange disposes along an outer circumferential portion of the valve element.

14. The labyrinth seal of claim 1, wherein the first flange has a shape that is different than a shape of the second flange.

15. The labyrinth seal of claim 1, wherein
the inner surface of the stationary element further comprises a second intermediate axially extending inner surface spaced radially outwardly from the first radially innermost axially extending inner surface, and a third radially outermost axially extending inner surface disposed radially outwardly from the second intermediate axially extending inner surface, wherein the second and third axially extending inner surfaces are connected by a second stepped radially extending surface, the outer surface of the rotary element comprises a first axially extending outer surface, a second axially extending outer surface spaced radially inwardly of the first axially extending outer surface, and a stepped radially extending surface disposed between the first and second outer surfaces, wherein the groove is formed on the second axially extending outer surface, and the second intermediate axially extending inner surface and the second stepped radially extending surface of the stationary element, and the second axially extending outer surface and the stepped radially extending surface of the rotary element define a space where the valve element is disposed when mounted within the groove.

16. A method of forming a seal between a shaft and a housing, comprising
providing a labyrinth seal assembly having a stationary element, a rotary element and a valve element, where the valve element is disposed in a groove formed in the rotary element and is positioned when assembled between the stationary element and the rotary element, and moving the valve element between a contacting position and a non-contacting position based on rotation of the shaft, wherein the valve element is sized and dimensioned such that a portion of the valve element extends radially outwardly from the groove when mounted therein, and wherein the valve element is adapted to contact the stationary element when disposed in the contacting position to form the seal, wherein the stationary element has an outer surface and an inner surface, wherein the inner surface includes a first radially innermost axially extending inner surface and a first stepped radially extending surface coupled thereto, and wherein the valve element is adapted to contact the first stepped axially extending surface when disposed in the contacting position.

17. The method of claim 16, further comprising disposing the valve element in the non-contacting position when the shaft rotates, and disposing the valve element in the contacting position when the shaft ceases rotation.

18. The method of claim 16, wherein the valve element is formed from an elastomeric material.

19. A labyrinth seal assembly for forming a seal between a shaft and a housing, comprising
a stationary element configured to be coupled to the housing and having an annular shape defining a space through which the shaft extends,
a rotary element disposed within the space and coupled to the shaft so as to rotate therewith, the rotary element having an outer surface that extends in an axial direction and having a groove formed therein, the rotary element being disposed between the stationary element and the shaft, and a valve element mounted within the groove and disposed between the stationary element and the rotary element when assembled to form the seal, wherein the valve element is formed from an elastomeric material, wherein the stationary element has an outer surface and an inner surface, wherein the inner surface includes a first radially innermost axially extending inner surface and a first stepped radially extending surface coupled thereto, and wherein the valve element is movable between a contacting position and a non-contacting position in response to rotation of the shaft, and wherein the valve element is adapted to contact the first stepped axially extending surface when disposed in the contacting position to form the seal.

\* \* \* \* \*